(12) United States Patent
Finkeldey

(10) Patent No.: US 11,471,990 B2
(45) Date of Patent: Oct. 18, 2022

(54) METHOD FOR OPTICAL MEASUREMENT

(71) Applicant: Klingelnberg GmbH, Hückeswagen (DE)

(72) Inventor: Markus Finkeldey, Bochum (DE)

(73) Assignee: KLINGELNBERG GMBH, Huckeswagen (DE)

( * ) Notice: Subject to any disclaimer, the term of this patent is extended or adjusted under 35 U.S.C. 154(b) by 343 days.

(21) Appl. No.: 16/824,772

(22) Filed: Mar. 20, 2020

(65) Prior Publication Data
US 2020/0298362 A1    Sep. 24, 2020

(30) Foreign Application Priority Data
Mar. 20, 2019    (DE) .......................... 102019107188.7

(51) Int. Cl.
*B23Q 17/20*    (2006.01)
*G01B 11/06*    (2006.01)

(52) U.S. Cl.
CPC .............. *B23Q 17/20* (2013.01); *G01B 11/06* (2013.01)

(58) Field of Classification Search
CPC .................................................... B23Q 17/20
USPC ................. 33/501.7, 501.11, 501.14, 501.15
See application file for complete search history.

(56) References Cited

U.S. PATENT DOCUMENTS

| | | | |
|---|---|---|---|
| 4,646,443 A * | 3/1987 | Hofler | G01B 7/146 33/501.15 |
| 4,962,590 A * | 10/1990 | Ambrose | G01M 13/021 33/501.14 |
| 5,396,711 A * | 3/1995 | Iwasaki | G01B 5/166 33/501.14 |
| 7,730,627 B2 * | 6/2010 | Mashue | G01M 13/021 33/501.7 |
| 8,411,283 B2 | 4/2013 | Maschirow et al. | |

(Continued)

FOREIGN PATENT DOCUMENTS

DE    3703425 A1    10/1987
DE    102010055820 A1    6/2012
(Continued)

OTHER PUBLICATIONS

Search Report for Application No. GB 2003985.5, dated Nov. 30, 2020, 4 pages.

*Primary Examiner* — George B Bennett
(74) *Attorney, Agent, or Firm* — McCarter & English, LLP

(57) ABSTRACT

Method for the optical measurement of at least one measurand on a workpiece, including:
providing a workpiece to be measured, wherein the workpiece comprises a cyclically symmetrical geometry, such as a toothing or the like;
specifying the at least one measurand on the workpiece;
providing a measuring device having an optical measuring system for the contactless measurement of the measurand on the workpiece, wherein the optical measuring system has an optical sensor;
measuring the at least one measurand on the workpiece using the optical measuring system;
characterized by
providing at least one geometrical parameter of the workpiece to be measured; and
determining at least one measurement parameter for carrying out the optical measurement on the basis of the at least one measurand on the workpiece and/or the at least one geometrical parameter of the workpiece to be measured.

17 Claims, 3 Drawing Sheets

(56) References Cited

U.S. PATENT DOCUMENTS

| | | | |
|---|---|---|---|
| 9,719,767 B2* | 8/2017 | Knäbel | G01B 5/24 |
| 10,018,459 B2* | 7/2018 | Wuerfel | B23F 23/12 |
| 10,293,450 B2* | 5/2019 | Junker | B24B 49/04 |
| 2015/0285610 A1* | 10/2015 | Knäbel | G01B 5/24 |
| | | | 33/501.14 |
| 2016/0161250 A1 | 6/2016 | Nakamura | |
| 2018/0128596 A1 | 5/2018 | Mies | |
| 2021/0291309 A1* | 9/2021 | Kasahara | B23Q 17/2461 |

FOREIGN PATENT DOCUMENTS

| | | |
|---|---|---|
| DE | 102009036776 B4 | 11/2014 |
| DE | 102015121582 A1 | 6/2016 |

* cited by examiner

METHOD FOR OPTICAL MEASUREMENT

CROSS-REFERENCE TO RELATED APPLICATIONS

This application claims priority under 35 U.S.C. § § 119(a)-(d) to German patent application no. DE 10 2019 107 188.7 filed Mar. 20, 2019, which is hereby expressly incorporated by reference as part of the present disclosure.

FIELD OF THE INVENTION

The present disclosure relates to a method for the optical measurement of at least one measurand on a workpiece, having the following method steps: providing a workpiece to be measured, wherein the workpiece comprises a cyclically symmetrical geometry, such as a toothing or the like; specifying the at least one measurand to be measured on the workpiece; providing a measuring device having an optical sensor for the contactless measurement of the measurand on the workpiece; measuring the at least one measurand to be measured on the workpiece using the optical sensor.

BACKGROUND

Workpieces having cyclically symmetrical geometry, such as a gear wheel, a splined shaft, a planar clutch, or the like, are typically measured with the aid of tactile measuring methods. For this purpose, the relevant workpieces are chucked in a coordinate measuring machine and sampled with the aid of a measuring probe to acquire the geometry of the workpiece. In this manner, deviations of the manufactured workpiece from its target geometry are determined to check the workpiece quality and to monitor the manufacturing process and adapt it by corrections if necessary.

Tactile measurements on modern coordinate measuring devices are very precise and enable measurement accuracies in the micrometer range. However, tactile measurements are time consuming. If, for example, on a gear wheel, a measurement of a profile line and a flank line respectively of the left and right flanks is to be performed for all teeth of the gear wheel, a tactile measurement of the coordinate measuring device can last multiple minutes. This is because each tooth of the gear wheel has to be sampled at least once in the flank direction and at least once in the profile direction by the measuring probe for both the left and also for the right flank.

Depending on the measurement strategy, the measurement duration can increase by multiple times if multiple profile lines or flank lines are acquired on a flank in order to acquire defined quality features of the toothing, for example, the flank line or profile angle deviations, the flank line or profile shape deviations, or tooth flank modifications of the toothing, such as tip, root, and end reductions, longitudinal and latitudinal crowning, interleaving, or profile line and flank line angle modifications.

Optical measuring methods have the advantage over tactile measuring methods that rapid acquisition of measurands is possible. With respect to the measurement of toothings, it is apparent that a substantial time savings is possible solely in that the threading of the measuring probe into the relevant tooth gap and the respective physical touching of the flank to be measured before beginning the measurement of a respective tooth are omitted. The kinematics of the optical measurement procedure can thus be simplified in relation to tactile measuring methods, since the measuring machine having optical sensor does not, in comparison to the use of a measuring probe, have to kinematically reproduce the exact profile line or flank line of the toothing.

The measurement accuracy of optical methods for measuring workpieces having cyclically symmetrical geometry presently does not reach the measurement accuracy of tactile methods, however. Optical methods are therefore solely used as a supplement to tactile measurement, wherein the tactile measurement forms the reference.

SUMMARY

Against this background, the present disclosure is based on the technical problem of specifying a method and a device for optical measurement of the type mentioned at the outset, which does not have the above-described disadvantages or at least has them to a lesser extent, and, for example, of enabling an improved measurement accuracy for the quality and process monitoring of workpieces having cyclically symmetrical geometry.

According to a first aspect, the present disclosure relates to a method for optical measurement of at least one measurand on a workpiece, having the following method steps:

providing a workpiece to be measured, wherein the workpiece has a cyclically symmetrical geometry, such as a toothing or the like;

specifying the at least one measurand to be measured on the workpiece;

providing a measuring device having an optical measuring system for contactless measurement of the measurand on the workpiece, wherein the optical measuring system has an optical sensor;

measuring the at least one measurand to be measured on the workpiece using the optical measuring system.

The method is distinguished by providing at least one geometrical parameter of the workpiece to be measured; and defining at least one measurement parameter for carrying out the optical measurement with the aid of the at least one measurand to be measured on the workpiece and/or the at least one geometrical parameter of the workpiece to be measured.

According to the present disclosure, for example, the measurement accuracy of the method for optical measurement of the measurand on the workpiece having cyclically symmetrical geometry can be improved in that a measurement parameter of the optical measurement is defined in dependence on the at least one geometrical parameter of the workpiece to be measured and/or in dependence on the measurand to be measured. The optical measurement is therefore adapted in a workpiece-specific manner to the geometry of the workpiece to be measured and/or in dependence on the measurand to be measured.

According to a further design of the method, it is provided that the provision of the at least one geometrical parameter of the workpiece to be measured comprises one or more of the geometrical parameters listed hereafter:

minimal workpiece radius for which the variable to be measured is acquired;

maximum workpiece radius for which the variable to be measured is acquired;

maximum radius of the workpiece;

axial height of the workpiece;

surface roughness of the workpiece.

With the specification of the minimum and/or maximum workpiece radius for which the variable to be measured is acquired on the workpiece, for example, a measurement beginning or a starting point of a measurement section or a measurement region and/or a measurement end or end point of a measurement section or a measurement region can be established on the workpiece.

The maximum radius and/or the axial height of the workpiece can be used to determine retraction positions and safe movement paths for the NC axes of the measuring device in order to avoid collisions between the measuring device and the workpiece to be measured.

The surface roughness influences the reflections on the surface of the workpiece to be measured. Therefore, measurement parameters can be adapted with the aid of the surface roughness to optimize the measurement result.

According to a further design of the method, the workpiece comprises a toothing to be measured, wherein the provision of the at least one geometrical parameter of the workpiece to be measured comprises one or more of the geometrical parameters of the toothing listed hereafter: modulus, helix angle, tip circle diameter, root circle diameter, pitch direction, number of teeth.

The provision of the at least one geometric parameter of the workpiece to be measured can be performed by one or more of the steps listed hereafter:
  contactless measurement, such as optical measurement or the like;
  tactile measurement by means of a measuring probe of a coordinate measuring machine;
  manual input;
  online or offline query from a digital memory, such as a database, a local memory, a portable storage medium, or the like.

One or more of the following measurement parameters can be defined:
  trigger frequency, for example, selected from a range between 5 kHz inclusive up to 25 kHz inclusive;
  exposure time, for example, selected from a range between 30 µs to 200 µs inclusive;
  illumination intensity;
  tilt angle of the optical sensor;
  measurement movements of axes of the measuring device, such as axial advances, axial velocities, velocity of the workpiece rotation;
  axial offset of an optical axis of the optical measuring system in relation to an axis of rotation of the workpiece to be measured.

According to a further design of the method, it is provided that one or more of the values listed hereafter are additionally specified as input variables for determining the at least one measurement parameter:
  number of the measurement points along a first measurement section and/or number of the measurement points along a second measurement section;
  measurement resolution for a measurement area to be acquired;
  maximum measurement duration, within which the measurement is completed.

According to a further design of the method, it is provided that a measurement angle is determined for one or more measurement points before the measurement, wherein the measurement angle of a measurement point is zero if a measurement by the optical measuring system for the measurement point takes place perpendicularly in relation to the surface of the workpiece, and wherein the measurement angle is measured in relation to the position in which the measurement angle is zero. The measurement angle can in other words, for example, be defined as the angle which is enclosed by an optical axis of the optical measuring system and a perpendicular in relation to the surface of the workpiece in the measurement point.

The measurement angle, which can also be referred to as a sampling angle, has an influence on the achievable measurement accuracy of the optical measurement. It can thus be determined on the basis of the measurement angle to what extent an optical measurement is fundamentally reasonable for the relevant measurement point, or not. The surface roughness and the absorption behavior of the workpiece can be taken into consideration additionally thereto.

In at least some embodiments, it can be provided that the measurement angle due to an axial movement of the device during the measurement is less than or equal to 15° for a majority of the measurement points or every measurement point. It can be provided that the optical measuring system is moved to set these angles.

It can be provided that the optical measuring system is installed fixed in the device, so that only the workpiece is moved in relation to the optical measuring system during the optical measurement.

It can be provided that if the measurement angle for a measurement point is greater than 15°, for example, for the case of the fixed optical measuring system, measurement parameters, such as the exposure time or the illumination intensity or the like, are adapted to improve the measurement accuracy.

According to a further design of the method, it is provided that sensor-specific data and/or one or more functions for the influence of the measurement angle on the measurement accuracy of the optical sensor are stored in a data set and wherein, for example, at least one measurement parameter for the measurement point is adapted on the basis of the absolute value of the measurement angle of the measurement point.

It can thus be studied in preliminary experiments what influence the measurement angle has on the measurement accuracy of the sensor, in that a test object having a known surface roughness and a known absorption behavior is measured at various measurement angles. As a result, for example, data are provided on the influence of the measurement angle on the measurement accuracy over a measurement angle range of 0-80°. This procedure can be repeated for various test objects having further defined surface roughnesses and known absorption behavior. Furthermore, measurement parameters, such as the illumination intensity, the exposure time, the measurement distance, and the like can be varied during these preliminary experiments to acquire the measurement accuracy for the various boundary conditions of the optical measurement.

For a workpiece having a known geometry, a known surface roughness, and a known absorption behavior, sensor-specific measurement parameters can therefore be defined with the aid of the measurement angle on the basis of the data of the preliminary experiments to improve the measurement result.

According to a further design of the method, it is provided that sensor-specific data and/or one or more functions for the influence of the surface roughness on a measurement accuracy of the optical sensor are stored in a data set and wherein, for example, at least one measurement parameter for the measurement point is adapted on the basis of the surface roughness of the measurement point.

It can be studied in preliminary experiments which influence the surface roughnesses on the measurement accuracy of the sensor, in that multiple test objects each having a known surface roughness and a constant absorption behavior are measured at a defined measurement angle. As a result, for example, data on the influence of the surface roughness on the measurement accuracy over a roughness range of Ra 0.1-0.9 μm are provided, for example. This procedure can be repeated for various test objects having further defined absorption properties and at one or multiple defined measurement angles for various surface roughnesses. Furthermore, measurement parameters, such as the illumination intensity, the exposure time, the measurement distance, and the like can be varied during these preliminary experiments to acquire the measurement accuracy for the various boundary conditions of the optical measurement.

For a workpiece having a known geometry, a known surface roughness, and a known absorption behavior, sensor-specific measurement parameters can therefore be determined with the aid of the surface roughness on the basis of the data of the preliminary experiments to improve the measurement result.

According to a further design of the method, it is provided that sensor-specific data and/or one or more functions for the influence of the absorption of the workpiece surface on a measurement accuracy of the optical sensor are stored in a data set and wherein, for example, at least one measurement parameter for the measurement point is adapted on the basis of the absorption of the workpiece surface of the measurement point.

It can be studied in preliminary experiments what influence the absorption behavior of a workpiece has on the measurement accuracy of the sensor, in that multiple test objects of various materials or coatings of a defined surface roughness are measured at a defined measurement angle. As a result, data on the influence of the absorption behavior for various materials or coatings are provided. Furthermore, measurement parameters, such as the illumination intensity, the exposure time, the measurement distance, and the like can be varied during these preliminary experiments to acquire the measurement accuracy for the various boundary conditions of the optical measurement.

For a workpiece having a known geometry, a known surface roughness, and a known absorption behavior, sensor-specific measurement parameters can therefore be defined with the aid of the absorption behavior on the basis of the data of the preliminary experiments to improve the measurement result.

It can be provided that for a workpiece having known geometry, known surface roughness, and a known absorption behavior, an achievable measurement accuracy is determined before the measurement. In this case, it can be determined, on the basis of the sensor-specific data on the influence of the measurement angle, the surface roughness, and the absorption behavior known from the preliminary experiments, what measurement accuracy can be reached at most, and also the measurement parameters can be set optimally against the background of the measurement angle, the surface roughness, and the absorption behavior. In this manner, an item of information on the achievable accuracy for a specific workpiece can be provided to a user even before the measurement. On the basis of this item of information, a user can decide whether the optical measurement is suitable for a relevant workpiece and the measurand to be acquired, or whether a tactile measurement should be performed.

It can be provided that the device comprises a tactile measuring system in addition to the optical measuring system.

Furthermore, according to one refinement of the method, the optical sensor can be a distance sensor, for example, is an optical point sensor for distance measurement, such as a triangulation sensor, a confocal chromatic sensor, or the like, wherein, for example, a series acquisition of individual measurement points is performed. The measurement range of such a sensor can be 0.1 mm-50 mm, for example, 2-10 mm.

Alternatively or additionally, further distance sensors can be used, such as confocal sensors, interference sensors, laser sensors according to the runtime method or the frequency comb method.

According to a further design, it is provided that the workpiece comprises a toothing to be measured, wherein more than one-fourth of the teeth, more than half of the teeth, or all teeth of the toothing are measured and in at least some embodiments a mean value of the measured values of the measured teeth is formed for at least one measurand and/or a correction value is generated from the measured values of the measured teeth to adopt a manufacturing process of the workpiece.

A further design of the method is distinguished in that the workpiece comprises a toothing to be measured, wherein the specification of the at least one measurand to be measured on the workpiece comprises one or more of the measurands listed here after: indexing individual deviation; indexing total deviation; concentricity deviation; tooth thickness deviation; profile angle deviation; profile shape deviation; profile overall deviation; flank line angle deviation; flank line shape deviation; flank line overall deviation; tip reduction; root reduction; profile angle modification; vertical crowning; end reduction; flank line angle modification; latitudinal crowning; profile interleaving; flank line interleaving.

It can be provided that a workpiece rotation in relation to the optical sensor is performed during the measurement, wherein the workpiece rotation takes place observed over a rotational angle range at an angular velocity greater than 0 and without rotational direction reversal, wherein the angle range rotational angle range is greater than or equal to 90°, greater than or equal to 180°, greater than or equal to 270°, greater than or equal to 360°, or greater than or equal to 720°.

It can be provided that the workpiece rotates at least five times or at least ten times completely around its own axis during the measurement.

Alternatively or additionally, it can be provided that a workpiece rotation in relation to the optical sensor is performed during the measurement, wherein the workpiece rotation takes place observed over a rotational angle range at constant angular velocity, wherein the angle range rotational angle range is greater than or equal to 90°, greater than or equal to 180°, greater than or equal to 270°, greater than or equal to 360°, or greater than or equal to 720°.

Alternatively or additionally, it can be provided that an axial relative movement between the optical sensor and the workpiece takes place during the measurement, wherein the axial relative movement takes place at constant velocity observed over at least one-fourth of the axial workpiece extension or takes place at constant velocity observed over at least half of the axially measured workpiece extension or takes place at constant velocity observed over the entire workpiece height.

The optical measuring system has a distance to an envelope of the workpiece during the measurement, wherein the envelope is defined by the maximum diameter and the axial height extension of the workpiece. If the workpiece includes, for example, a toothing, the optical measuring system is not located within a tooth gap at any point in time of the measurement, but rather is arranged outside a tip circle and/or an envelope of the gear wheel and/or has a distance thereto at every point in time of the measurement.

Several case examples are discussed hereafter to illustrate in greater detail the relationship between one or more provided geometrical parameters, the at least one measurand to be measured, and the measurement parameters.

As the first case example, the measurement of a profile line, for example, a profile angle deviation, a profile shape deviation, and a tip reduction of all teeth of a linear-toothed spur gear having involute external toothing will be discussed. The optical measuring system is positioned in this case in such a way that an optical axis of the optical measuring system is oriented perpendicularly to an axis of rotation of the spur gear and intersects the axis of rotation of the spur gear. The relative movement between the spur gear and the optical measuring system is performed solely by a rotational movement of the spur gear, so that all teeth of the spur gear are guided past the optical measuring system at least once.

The transition between a tooth tip and a tooth flank of a respective tooth of the spur toothing is sharp-edged or has a small radius in the present case. Fuzzy images and thus measurement inaccuracies can occur in this region.

To acquire the transition between the tooth tip and the tooth flank of a tooth reliably, the trigger frequency, i.e., the sampling rate, can be increased and/or the exposure time can be reduced. Alternatively or additionally, the rotational velocity of a relative rotational movement of the workpiece to be measured in relation to the optical measuring system can moreover be reduced.

It can accordingly be provided that the profile in the region of the tooth flank is measured using a lower sampling rate and/or a higher exposure time than the region of the transition between the tooth tip and the tooth flank of a tooth. The trigger frequency and/or the exposure time can accordingly be adapted during the measurement in dependence on the measured profile region. This applies similarly to the rotational velocity of the sensor, with which the gear wheel is moved in relation to the optical measuring system.

For a complete 360° revolution of the gear wheel, a sequential increase and reduction of the above-mentioned values of trigger frequency and/or exposure time and/or rotational velocity can therefore be performed, since the adjoining tip and flank regions are measured successively in a continuous pass. If the gear wheel under discussion here comprises, for example, 20 teeth, the gear wheel can be divided observed around its axis of rotation into adjoining angle sections, namely 20 tip sections and 20 flank sections, wherein the flank sections comprise the left and right flanks arranged between the tooth tips, the tooth base, and also the tooth root.

A trigger frequency and/or an exposure time and/or a rotational velocity can be defined for each of the adjoining angle sections. Thus, a first flank section, which extends, for example, over an angle range from 0°-14°, can be measured using a higher exposure time and/or lower trigger frequency and/or higher rotational velocity than a tip section adjoining thereon, which extends over an angle range from 15°-18°. For the measurement of a gear wheel, 20 measurement regions having higher exposure time and/or lower trigger frequency and/or higher rotational velocity and 20 further measurement regions having lower exposure time and/or higher trigger frequency and/or lower rotational velocity in comparison thereto therefore result in this case.

Alternatively, it can be determined which exposure time and/or trigger frequency and/or rotational velocity are required for the reliable measurement of the transition between the tooth tip and the tooth flank of a tooth. These values can also be assumed for the measurement of the entire gear wheel, i.e., also the tooth flanks and tooth root regions.

It can therefore be provided that at least one of the measurement parameters, for example, exposure time and/or trigger frequency and/or rotational velocity, is adapted in dependence on a course of a profile line of the cyclically symmetrical geometry and/or is sequentially varied during the measurement.

It is obvious that in addition to the rotational movement mentioned for this example during a measurement of a cyclically symmetrical geometry, further translational infeed movements and/or pivot movements are executed to change the relative position of the workpiece to be measured and the optical measuring system. Thus, for example, the rotational movement can be overlaid with an axial relative movement between the workpiece and the optical measuring system, wherein circumferential sampling takes place along a helical line.

The principles of the above-mentioned example cited for the external linear toothing may be transferred similarly to the measurement of internal toothings, helical toothings, bevel gears, and the like.

As a second case example, the measurement is discussed of a region of a cyclically symmetrical geometry, which is essentially perpendicular to the optical axis of the optical measuring system. Reflections can arise in this case, which negatively affect the measurement result of the optical distance measurement. For the above-described example of the spur toothing, this can occur, for example, during the measurement of the tooth root of a tooth of the toothing.

To avoid this impairment, it can be provided that for a measurement of the geometry of a region of the cyclically symmetrical geometry which is oriented essentially perpendicularly to the optical axis of the optical measuring system, the illumination intensity is reduced. Alternatively or additionally, the exposure time and/or the trigger frequency and/or the rotational velocity can be adapted.

As a third case example, the toothing-dependent adaptation of the sensor sampling rate and/or trigger frequency is discussed. For a measurement point interval on the lateral surface of a solely cylindrical workpiece, the following relationship applies for a rotational relative movement of the workpiece in relation to the optical sensor:

$$MA = \pi * Dk * V_{C-axis} * \frac{1}{SAR}$$

where MA: measurement point interval on the cylinder in mm,

Dk: the diameter of the cylinder in mm,

VC-axis: the rotational velocity in revolutions per second,

SAR: the sensor sampling rate in measurements per second.

If a profile line of a tooth of the toothing is to be measured, this measurement point interval for a toothing is also projected onto the profile line of the tooth itself and therefore has to be multiplied by a projection factor. This projection factor is dependent on the respective toothing parameters. Under the hypothetical assumption of a profile angle of approximately 45°, this factor is therefore 1.41.

For a gear wheel having a tip circle diameter DK of 50 mm, a rotational velocity VC-axis of 0.2 revolutions per second, and a sensor sampling rate of 5 kHz, a measurement point interval MA of approximately 0.009 mm results for assumed profile angles of 45°.

For a further workpiece, having a tip circle diameter of 200 mm, a measurement point interval MA for the acquisition of the profile line of approximately 0.045 mm results for otherwise identical boundary conditions. To achieve the same resolution and/or the same measurement interval MA of 0.009 for the acquisition of the profile line here, the sampling rate would have to be increased by a factor of four to 20 kHz. Alternatively, the rotational velocity could be halved and the sampling rate could be doubled.

It can therefore be provided that to set a measurement point interval, the sensor sampling rate and/or the rotational velocity are set for a workpiece to be measured in dependence on a diameter of the workpiece and an inclination of the workpiece region to be measured.

It can be provided that at least one measurement parameter is adapted during the measurement in dependence on the form of the cyclically symmetrical geometry to be measured, as already described above by way of example for the adaptation of the sampling rate in the tip or flank region.

An optical axis of the optical measuring system and an axis of rotation of the workpiece can be arranged without an axial offset and can thus intersect. The optical axis and the optical measuring system can intersect at a right angle and/or extend perpendicularly to one another. The optical axis and the axis of rotation can meet one another at an angle different from 90°. The angle can thus be selected and optionally varied during the measurement in such a way that, for example, shadowing of the region to be measured is avoided. Depending on the surface composition and geometry of the workpiece to be measured, the signal-to-noise ratio of the optical measurement can be improved by a static definition and/or a dynamic adaptation of the angle of the optical axis in relation to the workpiece or a workpiece surface to be measured, respectively.

Alternatively, the optical axis of the optical measuring system and the axis of rotation of the workpiece can have an axial offset in relation to one another and can thus be arranged skewed. The axial distance can thus be selected and optionally varied during the measurement in such a way that, for example, a shadow of the region to be measured is avoided. Depending on the geometry of the workpiece to be measured, the signal-to-noise ratio of the optical measurement can be improved by a static definition and/or a dynamic adaptation of the axial distance during the measurement. Similarly, the inclination of the optical axis in relation to the workpiece can also be varied and/or adapted with an axial distance.

It can be provided that the determination of the measurement parameters is performed fully automatically with the aid of a software application, which may be stored locally on a computer of the measuring device and/or is connected via a network to the measuring device.

BRIEF DESCRIPTION OF THE DRAWINGS

Exemplary embodiments, which are understood not to be limiting, will be described in greater detail hereafter with reference to the drawings.

DETAILED DESCRIPTION

Figure 1:
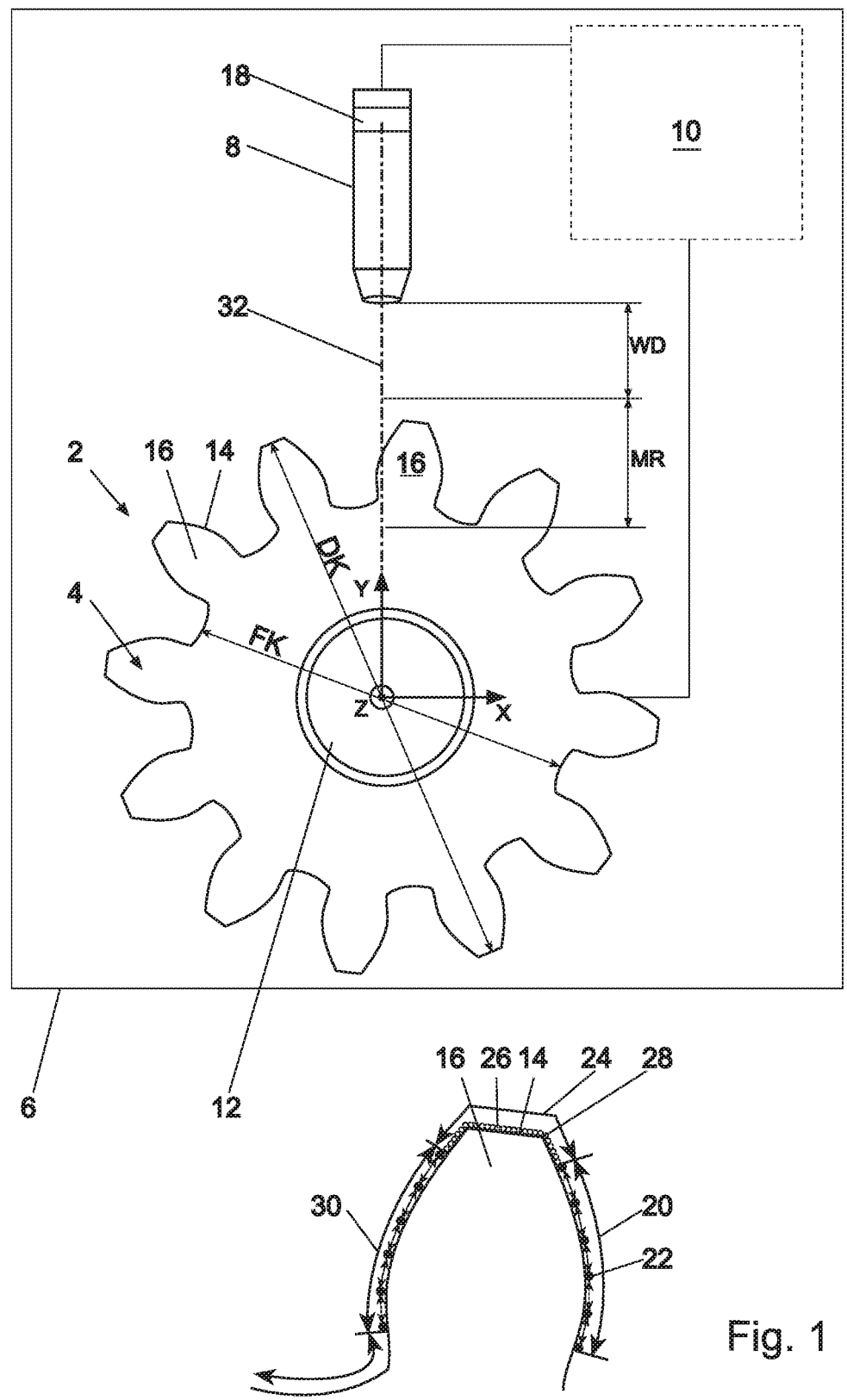
FIG. 1 shows a device for optical measurement having a gear wheel.

A first example of a method according to the present disclosure for optical measurement of at least one measurand on a workpiece is described hereafter with reference to FIG. 1.

Firstly, a provision of a workpiece 2 to be measured is performed, wherein the workpiece 2 comprises a cyclically symmetrical geometry 4, in the present case a toothing 4. The workpiece 2 is therefore a gear wheel 4.

Furthermore, a measuring device 6 having an optical measuring system 8 for contactless measurement of a measurand on the workpiece 2 is provided. The measuring device 6 has a control and processing unit 10. The optical measuring system 8 has an optical sensor 18, which is a distance sensor 18, wherein a series acquisition of individual measurement points is performed during the measurement.

The distance WD is the working distance which the optical measuring system 8 requires for the measurement. The distance MR is the working range, in which the optical measuring system 8 can acquire measured values. In the present case, a tooth 16 of the gear wheel 4 is therefore located completely in the working range MR of the optical measuring system 8, so that no relative movement in the y direction occurs during the measurement.

The workpiece 2 to be measured is chucked on a workpiece spindle 12 of the measuring device 6.

The at least one measurand to be measured on the workpiece 2 is specified. This can be performed by manual input into the control and processing unit 10 or by starting a predefined measurement program sequence of the control and processing unit 10, for which one or more measurands to be measured are stored.

The measuring device 6 can be an independent coordinate measuring device, which does not have tools for chip-removing workpiece machining having geometrically defined or geometrically undefined cutting edge.

The measuring device 6 can be an integral workpiece of a machine tool, which has tools for chip-removing workpiece machining having geometrically defined or geometrically defined cutting edge, such as a milling machine, for example, a gear cutting milling machine, a grinding machine, for example, a gear cutting grinding machine, or the like.

In the present case, the profile line 14 of the toothing 4 is specified as the measurand. The profile line 14 of the toothing 4 is to be acquired over the entire circumference of the gear wheel 2 and thus for all teeth 16 of the gear wheel 2.

The following parameters of the gear wheel 2 are provided: modulus of the gear wheel 2, the number of teeth of the gear wheel 2, the tip circle diameter DK of the gear wheel 2, and the root circle diameter of the gear wheel 2.

The provision of the at least one geometrical parameter of the workpiece 2 to be measured is performed here by query from a digital memory of the control and processing unit 10, in which the target data of the gear wheel 2 are stored.

In a further method step, the determination of a plurality of measurement parameters for carrying out the optical measurement is performed. The control and processing unit 10 determines the measurement parameters: trigger frequency, selected from a range between 5 kHz to 25 kHz inclusive; exposure time, selected from a range between 30 µs to 200 µs inclusive; illumination intensity; tilt angle of the optical sensor; measurement movements of the measuring device, such as axial advances, workpiece rotation, and the like; axial offset of an optical axis of the optical measuring system in relation to an axis of rotation of the workpiece to be measured.

The following are used as input variables for determining the measurement parameter: The measurand "profile line" to be acquired and the mentioned geometric parameters.

In the present case, the control and processing unit 10 computes, for a first section 20 of the profile line 14, which comprises the tooth flank, a first number of measurement points 22, to acquire the course of the profile line 14 in the first section 20 with a specified accuracy. The measurement points 22 are arranged distributed equidistantly observed along the profile line 14.

In the present case, the control and processing unit 10 computes for a second section 24 of the profile line 14, which comprises the tooth tip, a second number of measurement points 26 in order to acquire a sharp-edged transition 28 from the flank to the tip with a specified accuracy. The measurement points 26 are arranged distributed equidistantly observed along the profile line 14.

The measurement points 26 have a smaller measurement point interval than the measurement points 22. The resolution of the measurement is thus increased for the region 24 in comparison to the region 20 in order to be able to reliably acquire the sharp-edged transition 28. This can be achieved in that the trigger frequency or sampling rate is increased and the exposure time is reduced for the region 24. Alternatively or additionally, a rotational velocity of the workpiece 2 around the Z axis in relation to the optical measuring system can be reduced to increase the measurement resolution for the region 24.

A measurement point interval corresponding to the region 20 can be selected for a region 30. Since the measurement of the individual points 20, 26 and thus also of the adjoining measurement regions 20, 24, 30 takes place sequentially, the measurement parameters are varied sequentially during a measuring procedure, i.e., in dependence on the present measurement region 20, 24, 30. The measurement parameters are thus adapted during the measurement in dependence on the shape of the cyclically symmetrical geometry 4 to be measured.

An optical axis 32 of the optical measuring system 8 intersects a Z axis of a Cartesian coordinate system X, Y, Z at a right angle. During the measurement, the workpiece 2 rotates around the Z axis until all teeth 16 of the gear wheel 2 have been guided past the optical measuring system at least once.

It is provided in this case that a workpiece rotation in relation to the optical measuring system 8 takes place during the measurement, wherein the workpiece rotation takes place at an angular velocity greater than 0 and without rotational direction reversal observed over a rotational angle range around the Z axis, wherein the angle range rotational angle range is greater than 360°.

The optical measuring system is fixed in the present case, so that only the workpiece is moved during the measurement movement. According to alternative exemplary embodiments, it can be provided that the optical measuring system is translationally movable in the x direction, y direction, and z direction, but is not pivotable. According to alternative exemplary embodiments, it can be provided that the optical measuring system is translationally movable in the x direction, y direction, and z direction and moreover is pivotable around one, two, or three axes.

The rotation of the workpiece 2 around the Z axis can be overlaid according to further exemplary embodiments with translational infeed and advance movements along the X axis and/or Y axis and/or Z axis and/or can be overlaid with additional pivot movements around the Y axis and X axis. In this case, NC-controlled linear and pivot axes, which are coupled to the control and processing unit and controlled thereby, can be associated with both the gear wheel 2 and also the optical measuring system 8.

Figure 2:
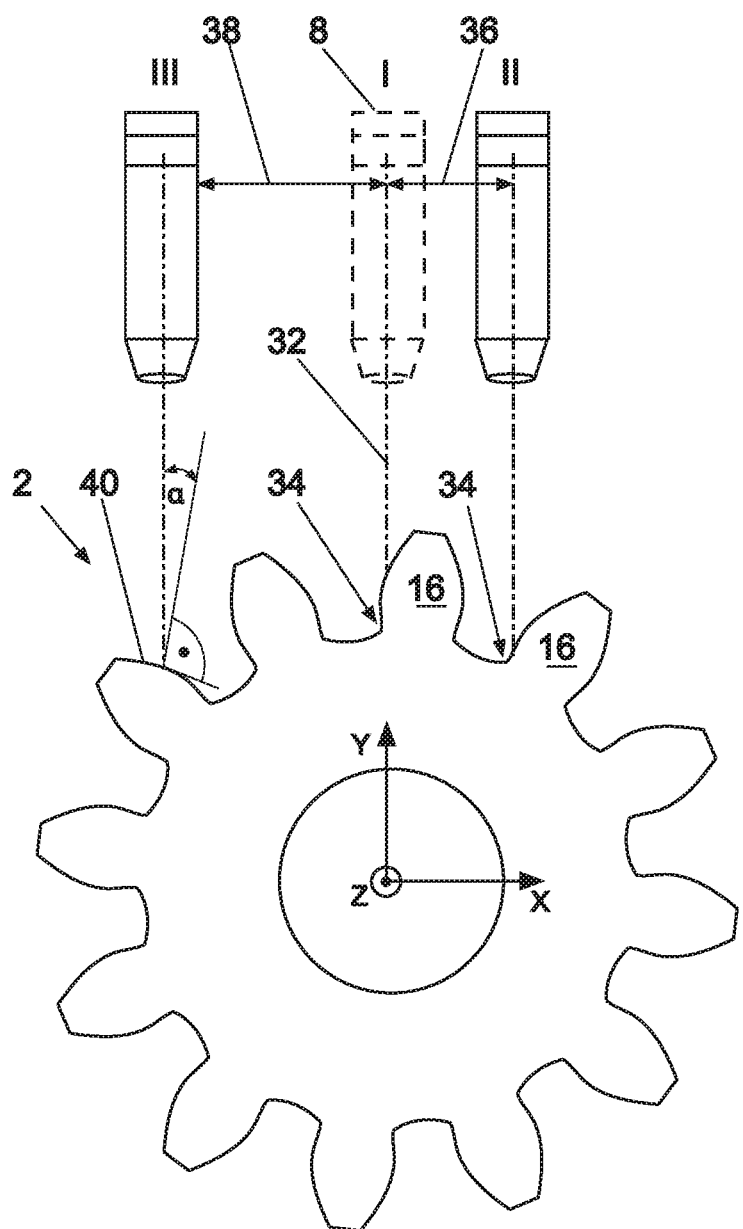
FIG. 2 shows the optical measuring system and the gear wheel from FIG. 1.

FIG. 2 shows the optical measuring system 8 from FIG. 1 in a simplified illustration. Three positions I, II, and III of the optical measuring system in relation to the gear wheel 2 are shown. The first position I of the optical measuring system corresponds to the position from FIG. 1 without axial offset, i.e., with intersecting optical axis 32 and Z axis.

As can be seen in FIG. 2, a root region 34 of the tooth 16 cannot be acquired, since the profile shape of the tooth shadows the root region. There is therefore no "line of sight connection," which is required for the measurement, between the root region 34 and the optical measuring system, which would enable a measurement.

In dependence on the profile shape of the gear wheel 2, the control and processing unit therefore determines an axial offset 36, by which the optical measuring system is advanced from the position I along the positive X direction into the position II in order to enable a measurement of the root region 34. It is thus recognizable in position II of the optical measuring system that a line of sight connection without shadowing extends along the optical axis 32 up into the root region 34 of a respective tooth 16. It is obvious that the workpiece 2 again rotates around the Z axis during the measurement.

Depending on the measurand to be acquired, multiple measurements having different axial offset can be carried out. Alternatively or additionally to the measurement in position I and/or position II, a measurement can thus be carried out having an axial offset 38 in position III, wherein the optical measuring system has been displaced from the position I in the negative X direction.

In addition to avoiding shadows, which can also occur for helical toothings and bevel gear toothings, the axial offset 36, 38 is used for optimizing a measurement angle or sampling angle $\alpha$, which the optical axis 32 encloses with the perpendicular to the surface 40 of the gear wheel 2, for example, to improve a signal-to-noise ratio of the optical measurement.

Figure 3:
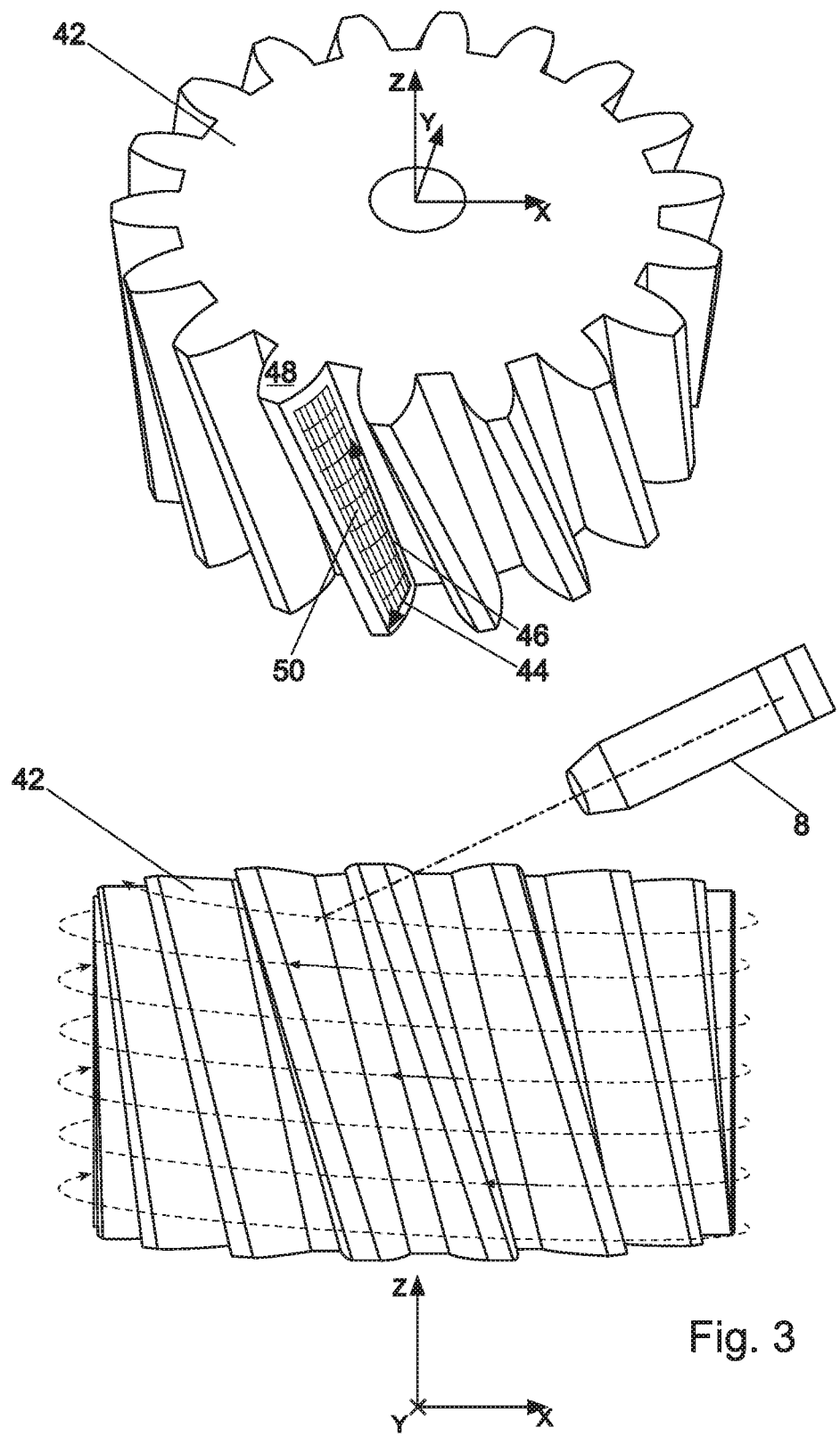
FIG. 3 shows an optical measurement of a helical toothing.

FIG. 3 shows a helical toothing 42, the flank and profile shapes of which are to be measured for each tooth for both the left flank and also for the right flank of each tooth. To simplify the illustration, only the optical measuring system 8 of the device 6 is shown.

Firstly, a measurement resolution, i.e., a number of measurement points in the profile direction 44 and a number of measurement points in the flank direction, is specified by an operator or by the control and processing unit. A virtual measurement grid 50 results therefrom for each tooth 48 of the gear wheel 42, as illustrated by way of example for one tooth. It is obvious that also tip and root of the tooth and the ends of the tooth can also be completely acquired.

The specifications of the measurement resolution are converted by the control and processing unit into measurement parameters, so that the helical relative movement illustrated by dashed lines in the lower part of the image between the optical measuring system 8 and the gear wheel 42 results. In this case, a workpiece rotation around the Z axis is overlaid with a translational advance movement in the Z direction.

Depending on the measurement range of the optical measuring system, infeed movements in the X and Y directions can moreover be overlaid according to alternative exemplary embodiments.

What is claimed is:

1. A method comprising:
specifying at least one measurand to be measured on a workpiece to be measured, wherein the workpiece comprises a cyclically symmetrical geometry; and
optically measuring said at least one measurand using a measuring device comprising an optical measuring system configured for contactless measurement of the at least one measurand on the workpiece, wherein the optical measuring system comprises an optical sensor, said optically measuring step including:
specifying at least one geometrical parameter of said workpiece to be measured; and
determining at least one measurement parameter for performing said optically measuring using the at least one measurand to be measured on the workpiece and/or the at least one geometrical parameter of the workpiece to be measured.

2. The method according to claim 1, wherein the at least one geometrical parameter is:
minimum workpiece radius for which the measurand to be measured is acquired;
maximum workpiece radius for which the measurand to be measured is acquired;
maximum radius of the workpiece;
axial height of the workpiece; and/or
surface roughness of the workpiece.

3. The method according to claim 1, wherein the workpiece comprises a toothing to be measured, and the at least one geometrical parameter is a modulus, helix angle, tip circle diameter, root circle diameter, slope direction, and/or number of teeth of said toothing.

4. The method according to claim 1, wherein the step of specifying the at least one geometrical parameter includes:
contactlessly measuring;
tactile measuring using a measuring probe of a coordinate measuring machine;
manually inputting the at least one geometrical parameter; and/or
online or offline querying from a digital memory.

5. The method according to claim 1, further comprising, before said optically measuring step, determining a measurement angle for at least one measurement point, wherein the measurement angle of the at least measurement point is zero when the optical measuring system measures the at least one measurement point perpendicularly to a surface of the workpiece, and wherein the measurement angle is determined relative to a position of the optical measuring system in which the measurement angle is zero.

6. The method according to claim 5, further including storing in a data set sensor-specific data and/or at least one function related to influence the measurement angle has on measurement accuracy of the optical sensor, wherein the step of determining at least one measurement parameter for the at least one measurement point includes using an absolute value of the measurement angle of the at least one measurement point.

7. The method according to claim 5, further including storing in a data set sensor-specific data and/or at least one function related to influence surface roughness has on measurement accuracy of the optical sensor, wherein the step of determining at least one measurement parameter for the at least one measurement point includes using a surface roughness of the at least one measurement point.

8. The method according to claim 5, further including storing in a data set sensor-specific data and/or at least one function related to influence absorption of a surface of the workpiece has on measurement accuracy of the optical sensor, wherein the step of determining at least one measurement parameter for the at least one measurement point includes using absorption of a workpiece surface of the at least one measurement point.

9. The method according to claim 1, wherein the step of determining at least one measurement parameter includes using as input variables therefor one or more of
number of measurement points along a first measurement section and/or number of measurement points along a second measurement section;
measurement resolution for a measured area to be acquired; or
maximum measurement duration within which the optically measuring is to be completed.

10. The method according to claim 1, wherein the at least one measurement parameter is:
trigger frequency;
exposure time;
illumination intensity;
tilt angle of the optical sensor;
measurement movements of axes of the measuring device; and/or
axial offset of an optical axis of the optical measuring system relative to an axis of rotation of the workpiece to be measured.

11. The method according to claim 1, wherein the optical sensor is a distance sensor, and the method further includes serially acquiring individual measurement points.

12. The method according to claim 1, wherein the workpiece comprises a toothing having a plurality of teeth, and the method further includes
measuring more than one-fourth of said plurality of teeth, more than half of said plurality of teeth, or all of said plurality of teeth of the toothing; and
determining a mean value of measured values of the measured teeth for at least one measurand and/or generating a correction value for adapting a manufacturing process of the workpiece from the measured values of the measured teeth.

13. The method according to claim 1, wherein the workpiece comprises a toothing to be measured and the at least one measurand to be measured on the workpiece defines indexing individual deviation; indexing total deviation; concentricity deviation; tooth thickness deviation; profile angle deviation; profile shape deviation; profile overall deviation; flank line angle deviation; flank line shape deviation; flank line overall deviation; tip reduction; root reduction; profile angle modification; vertical crowning; end reduction; flank line angle modification; latitudinal crowning; profile interleaving; and/or flank line interleaving.

14. The method according to claim 1, further including
performing rotation of the workpiece relative to the optical sensor during said optically measuring step over a rotational angle range at an angular velocity greater than zero and without rotational direction reversal, wherein the rotational angle range is greater than or equal to 90°, greater than or equal to 180°, greater than or equal to 270°, greater than or equal to 360°, or greater than or equal to 720°;
performing rotation of the workpiece rotation relative to the optical sensor during said optically measuring step over a rotational angle range at constant angular velocity, wherein the angle range rotational angle range is greater than or equal to 90°, greater than or equal to 180°, greater than or equal to 270°, greater than or equal to 360°, or greater than or equal to 720°; and/or performing axial relative movement between the optical sensor and the workpiece during said optically measuring step at constant velocity over at least one-fourth of an axial extent of the workpiece, at constant velocity over at least half of the axial extent, or at constant velocity observed over all the axial extent.

15. The method according to claim 1, further including adapting at least one of the at least one measurement parameter in dependence on a course of a profile line of the cyclically symmetrical geometry and/or sequentially varying at least one of the at least one measurement parameter;

reducing exposure intensity when optically measuring geometry of a region of the cyclically symmetrical geometry oriented substantially perpendicularly to an optical axis of the optical measuring system; and/or setting a measurement point interval, sensor sampling rate, and/or rotational velocity for the workpiece to be measured based on a diameter of the workpiece and an inclination of a workpiece region to be measured.

16. The method according to claim 1, wherein (a) the determining step is fully automatic using a software application and/or (b) the method further includes adapting at least one of the at least one measurement parameter based on a form of the cyclically symmetrical geometry to be measured.

17. The method according to claim 1, wherein the optical measuring system defines an optical axis and the workpiece defines an axis of rotation, and the optical axis of the optical measuring system and an axis of rotation of the workpiece define an axial offset relative to one another, and the optically measuring step includes performing at least one measurement with axial offset.

* * * * *